United States Patent [19]

Biale

[11] Patent Number: 5,026,782
[45] Date of Patent: Jun. 25, 1991

[54] POLYMERIC OPAQUE PARTICLES AND PROCESS FOR MAKING SAME

[75] Inventor: John Biale, Anaheim, Calif.

[73] Assignee: Union Oil Company of California, Los Angeles, Calif.

[21] Appl. No.: 248,783

[22] Filed: Sep. 23, 1988

[51] Int. Cl.$^5$ .................. C08F 259/06; C08F 265/06; B05D 7/04; B32B 27/10

[52] U.S. Cl. .................................. 525/317; 525/308; 525/902; 427/411; 428/84

[58] Field of Search ........................ 525/902, 317, 308

[56] References Cited

U.S. PATENT DOCUMENTS

| | | | |
|---|---|---|---|
| 3,177,173 | 4/1965 | Filter et al. | 260/29.7 |
| 3,254,044 | 5/1966 | Gunderman et al. | 525/317 |
| 3,324,066 | 6/1967 | Arcangeli et al. | 260/29.7 |
| 3,397,165 | 8/1968 | Goodman et al. | 260/29.7 |
| 3,423,351 | 1/1969 | Pierce et al. | 260/29.6 |
| 3,426,101 | 2/1969 | Ryan et al. | 260/876 |
| 3,657,172 | 4/1972 | Gallagher et al. | 260/29.6 RB |
| 3,673,282 | 6/1972 | Baer | 525/902 |
| 3,914,338 | 10/1975 | Krieg et al. | 260/876 |
| 4,002,801 | 1/1977 | Knechtges et al. | 525/317 |
| 4,226,752 | 10/1980 | Erickson et al. | 260/29.6 RB |
| 4,307,006 | 12/1981 | Suzuki et al. | 525/902 |
| 4,391,928 | 7/1983 | Herman et al. | 523/201 |
| 4,427,836 | 1/1984 | Kowalski et al. | 525/301 |
| 4,460,742 | 7/1984 | Kishida et al. | 525/64 |
| 4,468,498 | 8/1984 | Kowalski et al. | 525/301 |
| 4,469,825 | 9/1984 | Kowalski et al. | 523/201 |
| 4,497,917 | 2/1985 | Upson et al. | 523/201 |
| 4,594,363 | 6/1986 | Blankenship et al. | 521/64 |
| 4,613,633 | 9/1986 | Sekiya et al. | 523/201 |
| 4,631,235 | 12/1986 | Biale | 428/518 |
| 4,677,003 | 6/1987 | Redlich et al. | 427/373 |
| 4,683,269 | 7/1987 | Aksman | 525/258 |
| 4,829,102 | 5/1989 | Biale | 523/201 |

FOREIGN PATENT DOCUMENTS

| | | | |
|---|---|---|---|
| 756229 | 3/1971 | Belgium | 525/902 |
| 0107378 | 5/1984 | European Pat. Off. | 525/902 |
| 173789 | 5/1986 | European Pat. Off. | 524/458 |
| 1291327 | 10/1972 | United Kingdom . | |

OTHER PUBLICATIONS

Rohm and Haas Acrylic Glass Temperature Analyzer.
Encyclopedia of Polymer Science and Technology, John Wiley & Sons, Inc., vol. 14, pp. 553–555 and 557–560 (1971).
Kasai et al., "Hollow Polymer Particles," *Chemical Abstracts*, (1986), No. 105:153705v, vol. 105, p. 11.
Chalmers, J. R., "Air and Polymer-Extended Paints," European Supplement to Polymers and Paint Colour Journal, Oct. 5, 1983, pp. 94–95, 97–98, 101–102.
*Paint and Surface Coatings: Theory and Practice*, R. Lambourne, Ed., "Air and Polymer Extended Paints (Microvoids and Plastic Pigments)", Sec. 9.5, pp. 373–375, (1987).
Ramaiah et al., "Microvoids Organic Coatings", *Progress in Organic Coatings*, 11 (1983), 267–285, Elsevier Sequoia, printed in The Netherlands.
Ramig et al., "Plastic Pigment: A Novel Approach to Microvoid Hiding, Effect of Composition of Latex Paint Performance", paper presented at the J. Oil Col. Chem. Assoc. held in Bath, 17–20 Jun. 1981, J. Oil Col. Chem. Assoc., 1981, 64, 439–447.
Spalding, B. J., "Encapsulated Pigment for Latex Paint", *Chemical Week*, Sep. 3, 1986, p. 45.
Tess et al., *Applied Polymer Science*, 2d Edition, pp. 131–150 (1985).

*Primary Examiner*—John C. Bleutge
*Assistant Examiner*—Vasu S. Jagannathan
*Attorney, Agent, or Firm*—Gregory F. Wirzbicki; Shlomo R. Frieman

[57] ABSTRACT

A core/shell polymer is capable of increasing a composition's whiteness or opacity. The core and shell polymers have either a crystalline structure or have a $T_g$ of at least about 50° C. The core polymer has a different composition than the composition of the shell polymer. The core polymer comprises vinylidene halide monomers and/or vinyl halide monomers. The core and shell polymers are either homopolymers or copolymers.

45 Claims, No Drawings

POLYMERIC OPAQUE PARTICLES AND PROCESS FOR MAKING SAME

BACKGROUND

The present invention relates to polymeric opacifying agents used in the production of paints, paper coatings, and films and, more particularly, to opacifying agents having a core/sheath structure.

The steady increase in the price of titanium dioxide ($TiO_2$) as well as the steady decrease in its availability have created a demand for products capable of replacing at least a part of the $TiO_2$ needed to opacify paints and other coating compositions. In $TiO_2$ and other naturally white products, such as snow, a multiplicity of irregular surfaces and/or microvoids randomly scatter light within these products to create the appearance of whiteness. Microvoid-containing polymer particles perform in a similar manner. When incorporated into a paint or paper coating composition, the microvoid-containing polymer particles cause a significant increase in the resulting composition's whiteness or opacity.

Recently, a number of approaches to incorporating microvoid-containing polymer particles into paint and paper coating formulations has been disclosed. (See "Air and Polymer Extended Paints," Chalmers et al., *European Supplement to Polymer Paint Colour Journal*, Oct. 5, 1983, pp. 94–102.) One approach entails the use of solid and/or vesiculated (hollow) polyester/styrene copolymer beads having a size in the range of 3 to 50 microns and marketed under the tradename "Spindrift." These particles are formulated to contain both air and $TiO_2$ within their interior. A major use of these particles has been to formulate matte paints with good polish resistance. However, unpigmented beads act as windows in the film and are generally used only for highly saturated colors. For cost effectiveness, the vesiculated beads have been generally used as a partial replacement for $TiO_2$.

In a second approach, aggregates of fine particles are formed by a process of addition polymerization under conditions of high shear in an aqueous medium. This process produces irregular shaped particles (sold under the name "Microblock"). The irregular shaped particles allegedly produce higher film strengths than produced by spherical beads. Unlike the vesiculated beads, described above, internal pigmentation with $TiO_2$ has not been found to be effective. Accordingly, the irregular shaped particles are usually combined with external $TiO_2$ and a film extender to produce high pigment value content (pvc) paints which are very flat.

In a third approach, fine particle size, non-film-forming, polystyrene hollow beads are used. These beads have a particle size range of the same order of magnitude as that of latex particles normally used in emulsion paints, namely 100 to 600 nm. Typically, the beads are blended with the latex particles in a 1:1 by weight ratio. These particles are sold under the tradename of "Plastic Pigment."

A fourth approach involves a suspension of non-film-forming hollow styrene/acrylic copolymer beads (typically 38% by weight, 52% by volume). The processes for manufacturing these microvoid particles are described in U.S. Pat. No. 4,427,836 (Kowalski et al. I), U.S. Pat. No. 4,469,825 (Kowalski et al. II) and U.S. Pat. No. 4,594,363 (Blankenship et al.). Kowalski et al. I and Blankenship et al. disclose the production and use of water insoluble particles made by sequential emulsion polymerization to form a swellable "core" z0 of polymeric acid. The core is then at least partially encased with a "sheath" or "shell" polymer permeable to a volatile base such as ammonia or an organic amine. Sheath permeability is necessary to allow the base to contact the core. Kowalski et al. II differs from Kowalski et al. I and Blankenship et al. in that in Kowalski et al. II the core comprises a polymeric base and the sheath polymer is permeable to an acid, e.g., acetic acid. When any of these particles are neutralized, the core swells and causes the entire particle to swell up. When a paint film containing these particles dries, water is lost from the beads' interior voids and replaced by air. The resulting empty "microvoids" act as light scattering sources, thus increasing the hiding power of the dried film. In addition to opacifying by scattering incident light, it has been postulated that these particles also contribute to hiding power by uniformly spacing $TiO_2$ particles and, thus, help prevent $TiO_2$ clumping. Accordingly, these particles supplement or replace a part of the pigmentary medium or extenders that would otherwise be required to achieve equivalent hiding power. For example, literature articles concerning these products indicate that these particles can replace up to about 25% of the $TiO_2$ content in a paint formulation. In particular, four parts by volume of these opaque polymers are approximately equal in hiding power to one part by volume of $TiO_2$.

SUMMARY OF THE INVENTION

In the present invention, a high degree of hiding power is achieved with a core/shell polymeric structure which requires neither swelling nor the presence of discrete microvoids.

The core/shell polymer of the present invention comprises a non-swellable core polymer having an outer surface and a shell polymer in physical contact with and covering at least a part of the outer surface of the core polymer. The shell polymer has a different composition from that of the core polymer. In one version, the core polymer comprises vinylidene halide monomers. In another version, the core polymer comprises vinyl halide monomers. The core and shell polymers can be either homopolymers or copolymers. In addition, the core and shell polymers have either a crystalline structure or a Tg of at least about 50° C. The core/shell polymer is formed by (a) polymerizing one or more monomers to form the non-swellable core polymer particle and (b) encapsulating the core polymer particle with a polymerized shell polymer.

The instant invention also encompasses (a) an emulsion comprising a liquid and the core/shell polymer, (b) a formulation comprising a binder and the core/shell polymer; (c) a composition formed by drying the formulation, and (d) a coated substrate formed by the steps of (i) applying a layer of the formulation to a substrate (e.g., paper or the surface of a three-dimensional object) and (ii) allowing the formulation to dry on the substrate.

DETAILED DESCRIPTION OF THE INVENTION

The present invention is directed to (a) a core/shell polymer, (b) a process for making the core/shell polymer, (c) an emulsion comprising a liquid and the core/shell polymer, (d) a formulation comprising a binder and the core/shell polymer, (e) a composition formed by drying the formulation, and (f) a coated substrate formed by the steps of (i) applying a layer of the formulation to a substrate and (ii) allowing the formulation to dry on the substrate. The core/shell polymers of the instant invention cause a significant increase in the whiteness or opacity of compositions that contain them.

In accordance with the present invention, the core/shell polymer comprises a non-swellable core polymer having an outer surface and a shell polymer in physical contact with and covering at least a part of the outer surface of the core polymer. The shell polymer has a different composition from that of the core polymer because the core/shell polymer's opacity is due, in part, to the difference between the index of refraction of the core polymer and index of refraction of the shell polymer. The greater the difference in the indices of refraction, the greater the opacity of the core/shell polymer. Because opacity is partially due to the difference in indices of refraction, it is preferred that the shell polymer substantially encapsulate the core polymer. In addition, since opacity is enhanced by the presence of discrete core/shell polymers, it is preferred that the core polymer and shell polymer each be either crystalline or have a glass transition temperature ($T_g$) of at least about 50° C. Preferably, the core polymer and the shell polymer will either be crystalline or have a $T_g$ of at least about 60° C. Generally, the shell polymer is non-crystalline. Typically, the $T_g$ range of the core and shell polymers is about 60° to about 105° C.

In one version of the instant invention, the core polymer comprises one or more vinylidene halide monomers. In another version of the instant invention, the core polymer comprises one or more vinyl halide monomers. Exemplary halides include chlorine and bromine. Due to their commercial availability, vinylidene chloride is the preferred vinylidene halide monomer and vinyl chloride is the preferred vinyl halide monomer.

The core polymer can be either a homopolymer or a copolymer. The copolymers can comprise two or more different vinylidene halide monomers or two or more different vinyl halide monomers or both vinylidene halide and vinyl halide monomers. In addition, the copolymers can comprise one or more monomers that are neither vinylidene halides nor vinyl halide monomers. For example, the core polymer can also comprise one or more ethylenically unsaturated comonomers. These ethylenically unsaturated comonomers preferably have one olefinic group, are free of alkynyl and —C≡N— linkages, and have no more than one other functionality selected from the group consisting of carboxylic, sulfonic, phosphonate, amino, nitrile, epoxide, hydroxyl, amide, and keto groups. To optimize polymerization activity, the comonomers more preferably have either none of these functionalities or only one carboxylate group of the formula

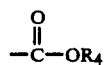

wherein $R_4$ is selected from the group consisting of hydrogen, nitro, amino, nitrile, and hydroxyl groups, organic radicals, hydrogen, and halogen. As used herein, the term "organic radical" refers to any radical containing at least one carbon atom. These radicals can be cyclic or acyclic, have straight or branched chains, and can contain one or more heteroatoms such as sulfur, nitrogen, oxygen, and phosphorus. Furthermore, the organic radicals can be substituted with one or more substituents such as thio, hydroxy, nitro, amino, nitrile, and halogen radicals or groups. In addition, the organic radicals can contain aryl groups, such as aralkyl and alkylaryl groups. Preferred polymerization rates are obtained when the organic radicals are substituted or unsubstituted aliphatic radicals. Exemplary saturated aliphatic radicals include straight and branched chain alkyl groups, cycloalkyl groups, alkyl substituted cycloalkyl groups, and cycloalkyl substituted alkyl groups. Generally, $R_4$ is hydrogen or an unsubstituted alkyl group. Since the ability of unsubstituted alkyl-containing, ethylenicallyunsaturated comonomers to polymerize decreases as $R_4$'s chain length increases, the unsubstituted alkyl group preferably contains no more than about 2 carbon atoms in its length. Hydrogen and methyl are the most preferred $R_4$.

Monoethylenically unsaturated acid comonomers are capable of helping to maintain the core's integrity. Typical monoethylenically unsaturated acid comonomers include acrylic acid, methacrylic acid, 2-propylpropionic acid, 2-butylpropionic acid, 2-pentapropionic acid, 2-hexylpropionic acid, cyclohexylacrylic acid, chloroacrylic acid, phenylacrylic acid, furylacrylic acid, 2-butenoic acid, 2-ethylhexyl 2-butionic acid, 2-pentenoic acid, 3-methyl-3-pentenoic acid, acryloxypropionic acid, itaconic acid, maleic acid, fumaric acid, and crotonic acid. Acrylic acid, methacrylic acid, and itaconic acid are the preferred monoethylenically unsaturated acid comonomer because they tend to uniformly polymerize with vinylidene halide and vinyl halide monomers and also tend to form latexes that exhibit good stability.

Nonionic comonomers are ethylenically unsaturated monomers that are devoid of reactive or functional groups. Typical nonionic comonomers include alkyl ($C_1$–$C_{20}$) esters of the foregoing monoethylenically unsaturated acid comonomers, styrene, vinyl toluene, ethylene, vinyl acetate, vinyl chloride, vinylidene chloride, acrylonitrile, and mixtures thereof.

The core polymer optionally comprises a small concentration of a cross-linkable comonomer. Cross-linkable comonomers include polyethylenically unsaturated monomers. Typical polyethylenically unsaturated monomers include ethylene glycol diacrylate, allyl acrylate, 1,3-butanediol diacrylate, 1,3-butylene diacrylate, diethylene glycol diacrylate, ethylene glycol dimethacrylate, 1,3-butanediol dimethacrylate, 1,3-butylene dimethacrylate, diethylene glycol dimethacrylate, trimethylol propanetriacrylate, divinylbenzene, and open-chain aliphatic conjugated diene comonomers. Exemplary open-chain aliphatic conjugated diene comonomers have the formula

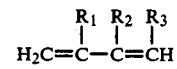

wherein $R_1$, $R_2$, and $R_3$ are each independently selected from the group consisting of hydrogen, halo, cyano, and methyl. Typical open-chain aliphatic conjugated diene comonomers include butadiene-1,3, 2-methylbutadiene-1,3, 2,3,-dimethyl-butadiene-1,3, piperylene, 2-chlorobutadiene-1,3, and 2-cyanobutadiene-1,3. The preferred cross-linkable comonomer is 1,3-butylene dimethacrylate.

The vinylidene halide and/or vinyl halide monomers and any optional comonomers are present in the core polymer in a concentration such that the core polymer maintains a crystalline structure or a $T_g$ of at least about 50° C. To achieve this end, a vinylidene halide containing core polymer generally comprises at least about 60 weight percent vinylidene halide base on the total weight of the core polymer Usually, a vinylidene halide containing core polymer comprises at least about 70 weight percent vinylidene halide. Preferably, about 70 to about 95 weight percent vinylidene halide is present in the core polymer. With respect to vinyl halide containing core polymers, these polymers typically comprise at least about 50 weight percent vinyl halide. The concentration range of the various comonomers varies and depends on the function performed by the comonomer in the core polymer as well as upon the comonomer's $T_g$ For example, the concentration of a cross-linkable comonomer in the core polymer is generally less than about 30 weight percent. When used, cross-linkable comonomers are typically present in a range of about 0.01 to about 20 weight percent.

The core polymer is non-swellable. As used herein, the term "non-swellable" means that the core polymer swells less than about 10 percent by volume when the core polymer is contacted with an acid or a base.

With respect to the shell polymer, the shell polymer comprises any of the nonionic monomers or combinations thereof mentioned above. However, because methyl methacrylate (MMA) tends to promote a faster rate of polymerization relative to other non-ionic monomers, MMA is preferred, either alone or in admixture with one or more other nonionic monomers, such as styrene, soft alkyl acrylate and methacrylate esters, isobornyl methacrylate, t-butyl methacrylate, and vinyl chloride. As used herein, the term "soft alkyl acrylate and methacrylate esters" means alkyl acrylate and methacrylate ester monomers that are capable of forming homopolymers having a $T_g$ of about $-20°$ to about $-60°$ C. The alkyl portion of the alkyl acrylate ester monomers typically has between 1 to about 8 carbon atoms while the alkyl portion of the alkyl methacrylate ester monomers typically contains about 6 to about 10 carbon atoms. Butyl acrylate is the preferred alkyl acrylate ester monomer because of its good polymerization reactivity. Typical alkyl methacrylate ester monomers include octylmethacrylate and decylmethacrylate.

An exemplary shell polymer contains up to 100 weight percent MMA based on the total weight of the monomers that comprise the shell polymer and up to 100 weight percent styrene. In addition, to avoid forming substantial amounts of coagulum or grit during the polymerization of the shell polymer, it is preferred that the shell polymer also comprise the soft alkyl acrylate and/or methacrylate ester monomer. Typically, the shell polymer comprises up to about 10 weight percent of the soft alkyl acrylate and/or methacrylate ester monomer. Preferably, the shell polymer comprises between about 4 to about 7 weight percent soft alkyl acrylate and/or methacrylate ester monomer. Below about 4 weight percent the grit formed during the shell polymerization step tends to be too high and above about 7 weight percent the opacity of the core/shell polymer tends to decrease.

In general, the core/shell polymer has an average particle size of about 200 to about 1000 nm. Typically, the average particle size of the core/shell polymer ranges from about 300 to about 600 nm. The core polymer usually has an average particle size of about 100 to about 300 nm. A preferred core polymer average particle size is about 150 to about 250 nm.

The core/shell polymer of the instant invention is made by a polymerization process. The process generally comprises emulsion polymerizing a plurality of monomers to form core polymer particles and encapsulating the core polymer particles with an emulsion polymerized shell polymer. Preferably, the core and shell polymers are made by an aqueous emulsion process. An exemplary process for making vinylidene halide monomer-containing polymers is disclosed in U.S. Pat. No. 4,631,235, which patent is incorporated herein by reference. With respect to vinyl halide-containing polymers, these polymers can be manufactured by methods such as disclosed in U.S. Pat. No. 3,657,172, which patent is incorporated herein by reference. The core polymer can be made by a single- or multi-stage process.

As is common in aqueous emulsion polymerizations, a water soluble, free radical initiator can be used alone or in combination with a reducing agent to form a redox system. The redox system enables the polymerization process to be conducted at lower temperatures. Exemplary free radical initiators include hydrogen peroxide, tertbutyl peroxide, and alkaline metal (e.g., sodium, potassium, and lithium) and ammonium persulfate. Exemplary reducing agents include sulfite, more specifically alkali metabisulfite, hydrosulfite, hyposulfite, and sodium formaldehyde sulfoxylate. Normally, the initiator and reducing agent are each used in an amount of about 0.01 to about 2 percent by weight of the monomer charge. The temperature of the aqueous emulsion usually ranges from about 10° to about 100° C. In general, the lower the reaction temperature, the higher the resulting polymer's molecular weight. When a persulfate system is used, the emulsion temperature typically is between about 60° to about 90° C.

The weight-average molecular weight of vinylidene halide and vinyl halide containing core polymers normally ranges from about 50,000 to about 200,000. When desired, a chain transfer agent can be used to control the molecular weight of the monoalkenyl aromatic-containing core polymers. This is true especially in reaction systems that contain a cross-linkable monomer. Exemplary chain transfer agents include lower alkyl mercaptans, such as sec-butyl mercaptan and monothiolglycerol. The normal concentration of chain transfer agents employed is in a range of about 0.1 to about 2 weight percent of the added monomer. When used, the chain transfer agent typically is present in a concentration of about 0.05 to about 1 weight percent. Alternatively, higher reaction temperatures, in the range of about 90° to about 100° C., can be used to keep the molecular weight down.

After the core polymer particles are formed, the core polymer particles are then encapsulated with the shell polymer. The encapsulation procedure is preferably conducted by adding an aqueous suspension of one or more of the shell monomers along with a small amount of initiator to the core latex and continuing the emulsion polymerization reaction. The shell polymerization reaction can be performed in the same reaction vessel in which the core polymer was formed. The shell polymer is formed by applying one or more layers, each layer having the same or different monomeric composition. As noted above, opacity is partially due to the difference between the indices of refraction of adjacent polymer layers that constitute the core/shell polymer. Accordingly, it is preferred that the shell polymer be formed by applying a plurality of layers that have different monomeric compositions so that adjacent layers possess different indices of refraction. As the number of layers increases, the difference in the indices of refraction between adjacent layers necessary to obtain satisfactory opacity can decrease. Regardless of whether the shell comprises only one layer or a plurality of layers, the final product is a colloid suspension or emulsion of the core/shell polymer particles.

The emulsion of the finished particles can comprise over 50 percent of the finished core/shell polymer particles without exceeding acceptable levels of coagulum and grit. This is a significant advantage of the present invention in that certain prior opaque polymers are only commercially available at an emulsion concentration of about 40 weight percent. The ability to manufacture opaque polymers and achieve high particle concentrations in the resulting emulsion is important since it reduces the amount of water ultimately shipped with the product and enables a manufacturer to more readily formulate the final composition because other ingredients need not be reformulated due to excessive water in the opaque polymer emulsion.

When the opaque polymers of the present invention are mixed with a suitable latex binder in a concentration of between about 5 to about 15 weight percent of the latex binder, the core/shell polymer dispersions or emulsions of the present invention produce compositions of particular usefulness in opacifying latex paint and paper coating formulations. These opaque polymers can supplement or replace pigmentary matter, such as titanium dioxide and/or titanium dioxide extenders. For example, the core/shell polymers of the present invention can typically replace up to about 35 weight percent of the titanium dioxide used in paints and other coating compositions. The finished emulsions of the core/shell polymer particles of the present invention can be used directly in such formulations. Alternatively, these emulsions can be dried to produce a free flowing powder that can be packaged, stored, sold, and shipped before use.

EXAMPLES

The manufacture of two core/shell polymers within the scope of the present invention is demonstrated in the following examples.

EXAMPLE 1

Manufacture of Core/Shell Polymer

Water (about 320 gm) was heated in a reactor to about 180° F. under a nitrogen purge. A catalyst (sodium persulfate, above 0.39 gm) and a core polymer (85/10/5 vinylidene chloride/methyl methacrylate (MMA)/acrylic acid (AA), about 11 gm (about 50 weight percent total solids)) were then added to the heated water. Next, about 136.8 gm MMA and about 7.2 gm BA were added to the reactor. The reactor temperature was maintained at about 185° F. After the resulting emulsion cooled, about 1.5 gm NH$_4$OH in about 10 ml water were added. The resulting emulsion had a total solids content of about 30.5 weight percent, a grit content of about 96 ppm on a 100 mesh screen, and a core/shell particle size of about 328 nm.

EXAMPLE 2

Manufacture of Core/Shell Polymer

A core/shell polymer was manufactured according to the procedure of Example 1, supra. The only substantial change was that the core polymer in the present example was a 90/9/1 vinylidene chloride/MMA/AA copolymer (about 8.5 gm) that contained about 60 weight percent total solids. The final emulsion contained about 30 weight percent total solids, had a grit content of about 132 ppm on a 100 mesh screen, and had a core/shell particle size of about 437 nm.

Although the present invention has been described in considerable detail with reference to certain preferred versions thereof, other versions are possible. For example, a paint or paper coating composition can contain a mixture of the core/shell polymers of the present invention. Therefore, the spirit and scope of the appended claims should not necessarily be limited to the description of preferred versions contained therein.

What is claimed is:

1. An opaque core/shell polymer comprising:
   (a) a non-swellable core polymer having an outer surface and a $T_g$ of at least about 50° C., and comprising a vinyl halide monomer; and
   (b) a shell polymer in physical contact with and covering the outer surface of at least a part of the core polymer, the shell polymer (i) comprising a sufficient vinylidene chloride monomer concentration so that the shell polymer has a crystalline structure and (ii) having a different composition from that of the core polymer, wherein the weight percent of the core polymer, based upon the total weight of the opaque polymer is less than the weight percent of the shell polymer, and the opaque polymer has a particle size of about 200 to about 1,000 nm.

2. An opaque core/shell polymer comprising:
   a non-swellable core polymer having an outer surface, a $T_g$ of at least about 50° C., and an average particle size of about 100 to about 300 nm, and comprising a vinyl halide monomer; and
   (b) a shell polymer in physical contact with and covering the outer surface of at least a part of the core polymer, the shell polymer (i) comprising a sufficient vinylidene chloride monomer concentration so that the shell polymer has a crystalline structure and (ii) having a different composition from that of the core polymer, wherein the weight percent of the core polymer, based upon the total weight of the opaque polymer, is less than the weight percent of the shell polymer.

3. An opaque core/shell polymer comprising:
   (a) a non-swellable core polymer having an outer surface, a crystalline structure, and comprising a vinylidene chloride monomer, the concentration of the vinylidene chloride monomer being at least about 60 weight percent based on the total weight of the core polymer; and
   (b) a shell polymer in physical contact with and covering at least a part of the outer surface of the core polymer, the shell polymer having (i) a vinylidene chloride concentration of at least about 60 weight percent based on the total weight of the shell polymer, (ii) a crystalline structure, and (iii) a composition different from the composition of the core polymer.

4. An opaque core/shell polymer comprising:
   (a) a non-swellable core polymer having an outer surface, and comprising a sufficient vinylidene chloride monomer concentration so that the core polymer has a crystalline structure; and (b) a shell polymer in physical contact with and covering at least a part of the outer surface of the core polymer, the shell polymer (i) comprising a sufficient vinylidene chloride monomer concentration so that the shell polymer has a crystalline structure and (ii) having a different composition from that of the core polymer.

5. A formulation comprising:
   (a) a latex binder; and
   (b) the opaque core/shell polymer of claim 1.

6. A coated substrate formed by the steps of:
   (a) applying a layer of the formulation of claim 5 to a substrate; and
   (b) allowing the formulation to dry on the substrate.

7. The coated substrate of claim 6 wherein the substrate is paper.

8. The coated substrate of claim 6 wherein the substrate is a surface of a three-dimensional object.

9. A composition formed by the step of drying the formulation of claim 5.

10. The opaque core/shell polymer of claim 1 wherein the core polymer is vinyl chloride.

11. The opaque core/shell polymer of claim 1 wherein the core polymer has a $T_g$ of at least about 60° C.

12. The opaque core/shell polymer of claim 1 wherein the core polymer has a $T_g$ of about 60° to about 105° C.

13. The opaque core/shell polymer of claim 1 wherein the core polymer is a homopolymer.

14. The opaque core/shell polymer of claim 1 wherein the core polymer is a copolymer.

15. The opaque core/shell polymer of claim 1 wherein the core polymer further comprises at least one ethylenically unsaturated comonomer.

16. The opaque core/shell polymer of claim 15 wherein the ethylenically unsaturated comonomer comprises up to about 30 weight percent of the core polymer.

17. The opaque core/shell polymer of claim 15 wherein the comonomer is at least one monoethylenically unsaturated acid monomer.

18. The opaque core/shell polymer of claim 15 wherein the comonomer is at least one nonionic monomer.

19. The opaque core/shell polymer of claim 1 wherein the core polymer has an average particle size of about 150 to about 250 nm.

20. The opaque core/shell polymer of claim 1 having an average particle size of about 300 to about 600 nm.

21. The opaque core/shell polymer of claim 1 wherein the shell polymer comprises a plurality of layers.

22. The opaque core/shell polymer of claim 21 wherein adjacent layers of the shell polymer have a different monomeric composition.

23. An emulsion comprising:
    (a) a water; and
    (b) the opaque core/shell polymer of claim 1.

24. The emulsion of claim 23 comprising at least about 50 weight percent of the opaque core/shell polymer.

25. The opaque core/shell polymer of claim 1 wherein the non-swellable core polymer has a first index refraction and the shell polymer has a second index of refraction, the first and second indices of refraction being different.

26. The opaque core/shell polymer of claim 1 wherein the core polymer has an average particle size of about 150 to about 250 nm and the opaque core/shell polymer has an average particle size of about 300 to about 600 nm.

27. A formulation comprising:
    (a) a latex binder; and
    (b) the opaque core/shell polymer of claim 2.

28. A coated substrate formed by the steps of:
    (a) applying a layer of the formulation of claim 27 to a substrate; and
    (b) allowing the formulation to dry on the substrate.

29. The coated substrate of claim 28 wherein the substrate is paper.

30. The coated substrate of claim 29 wherein the substrate is a surface of a three-dimensional object.

31. A composition formed by the step of drying the formulation of claim 27.

32. The opaque core/shell polymer of claim 2 wherein the core polymer is vinyl chloride.

33. An emulsion comprising:
    (a) a water; and
    (b) the opaque core/shell polymer of claim 2.

34. A formulation comprising:
    (a) a latex binder; and
    (b) the opaque core/shell polymer of claim 3.

35. A coated substrate formed by the steps of:
    (a) applying a layer of the formulation of claim 34 to a substrate; and
    (b) allowing the formulation to dry on the substrate.

36. The coated substrate of claim 35 wherein the substrate is paper.

37. The coated substrate of claim 35 wherein the substrate is a surface of a three-dimensional object.

38. A composition formed by the step of drying the formulation of claim 35.

39. An emulsion comprising:
    (a) a water; and
    (b) the opaque core/shell polymer of claim 3.

40. A formulation comprising:
    (a) a latex binder; and
    (b) the opaque core/shell polymer of claim 4.

41. A coated substrate formed by the steps of:
    (a) applying a layer of the formulation of claim 40 to a substrate; and
    (b) allowing the formulation to dry on the substrate.

42. The coated substrate of claim 41 wherein the substrate is paper.

43. The coated substrate of claim 42 wherein the substrate is a surface of a three-dimensional object.

44. A composition formed by the step of drying the formulation of claim 40.

45. An emulsion comprising:
    (a) a water; and
    (b) the opaque core/shell polymer of claim 4.

* * * * *